United States Patent Office 3,064,062
Patented Nov. 13, 1962

3,064,062
SELECTIVE DEHYDROGENATION OF
2,3-DIMETHYL BUTANE
Waldemar Lorz, Yeadon, George Alexander Mills, Swarthmore, and Harold Shalit, Drexel Hill, Pa., assignors to Air Products and Chemicals, Inc., a corporation of Delaware
No Drawing. Filed Sept. 20, 1960, Ser. No. 57,143
5 Claims. (Cl. 260—680)

This invention is concerned with the selective dehydrogenation of 2,3-dimethyl butane under conditions productive of high yields of $C_6$ olefins. It is more particularly directed to effecting such dehydrogenation with specially prepared catalyst and under conditions whereby high yields of the desired olefins are obtained with relatively moderate conversion of the charge to less desirable by-products.

While it is well known to dehydrogenate a wide variety of hydrocarbons under a multiplicity of operating conditions and in the presence of many established dehydrogenation catalysts, this invention makes available a commercially desirable operating system whereby unusually high yields of $C_6$ olefins are obtained under conditions such that skeletal structure remains largely unchanged during the dehydrogenation operation. Likewise, high yields at good selectivity for specific $C_6$ olefins are now possible by the controlled dehydrogenation of the selected charge stock, namely, 2,3-dimethyl butane.

Operation in accordance with the present invention utilizing catalysts as hereinafter described permits the dehydrogenation of 2,3-dimethyl butane to high yields of olefinic products having the same skeletal structure as the charge. The desired olefinic products are obtained in reasonably controllable quantitative distribution through the judicious selection of operating conditions within relatively narrow limits as hereinafter set forth. Likewise, operation in accordance with this invention permits utilization of substantially lower operating temperatures than heretofore possible in obtaining a high degree of selectivity plus high relative yield; moreover, in the present operation there is comparatively low production of by-product materials, including coke.

In accordance with this invention 2,3-dimethyl butane is selectively dehydrogenated to high yields of $C_6$ olefinic products with little attendant isomerization by dehydrogenative contact with a dehydrogenation catalyst comprising porous eta alumina having incorporated therewith 0.5 to 2.0% alkali metal oxide and 5 to 40% chromium oxide (calculated as $Cr_2O_3$) by weight of the catalyst. The catalyst is prepared by impregnation of a chromium compound convertible to the oxide into and on an eta alumina obtained by calcination of alumina hydrate containing at least 40% as the beta trihydrate. The impregnated alumina is heat-treated under conditions adjusting the surface area thereof to between 70 to 100 m.²/gram, such heat treatment including contact with an atmosphere comprising a major portion of hydrogen at a temperature in the range of 1300° to 1500° F. for a time period of at least one and no more than ten hours. The alkali metal compound may be associated with the alumina hydrate, or it may be added to the catalyst at any stage prior to final adjustment of surface area.

The operating conditions for dehydrogenation of the 2,3-dimethyl butane include pressures in the range of 10 mm. Hg absolute to about atmospheric, space rates (LHSV) of 0.5 to 4 volumes of hydrocarbon (measured as liquid) per hour per volume of catalyst, and a temperature within the range of 800–1100° F. In general, the temperature within the described range is selected in accordance with the nature of the olefins desired in the product; at the lower temperatures within the range mono-olefins are largely obtained while at the higher temperatures of the range production of diolefin is favored.

The desired surface area adjustment of the impregnated alumina can be effected by treatment in steam or in mixtures of steam-air or steam-hydrogen at temperatures above 1300° F. for at least several hours.

Ordinarily, catalysts prepared by incorporation of chromia into a calcined alumina of high surface area and obtained from alumina hydrates predominating in $\beta$-lumina trihydrate are exceedingly active in hydrocarbon conversion operations but are lacking in desired selectivity for dehydrogenation in that these catalysts indiscriminately promote a wide variety of reactions in addition to dehydrogenation including carbon-carbon scission (cracking), polymerization of olefins, isomerization, etc. and tend to produce undesired by-products, such as coke and low molecular weight hydrocarbon gases. However, by the described preparation and treatment of the catalyst in accordance with the present invention these "wild" tendencies of the catalyst are largely overcome and better controlled selective production of desired dehydrogenation products obtained.

Concerning the effect of sodium content, it appears that no great improvement in yield results from a high sodium content (1.5% by weight) over catalysts with a medium sodium content (0.8% by weight). Likewise, the lower range sodium content (0.5% by weight) is in the same general order of effectiveness. Since there is no really sharp divergence in effectiveness outside these ranges, but rather a more than desirable decrease in effectiveness and selectivity, it is to be understood that the cited range is strongly preferred, and that some deviation outside this range is possible without vitiating the contribution of the inventive principle as described and claimed. However, it can be seen from the data appearing hereinafter that the presence of sodium has an advantage in terms of lower coke forming characteristics at the higher olefin productivity.

From a theoretical viewpoint, without real or implied limitations inherent therein, a much smaller effect would be expected from a high sodium content in the dehydrogenation of 2,3-dimethyl butane than in the dehydrogenation of other hexanes. For example, the reaction mechanism of isomerization at acid sites on the catalyst appears to support such theory. Typical reaction forms include the following depiction

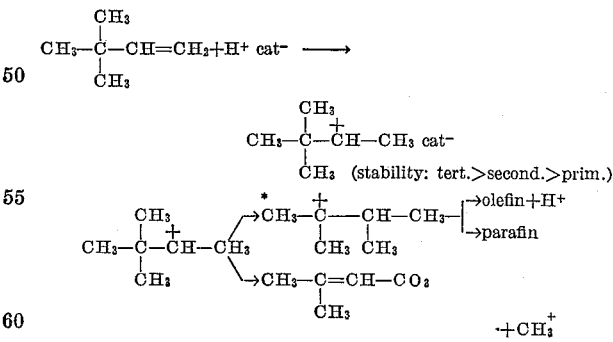

Upon dehydrogenation of 2,3-dimethyl butane, the species marked with an asterisk is the corresponding carbonium ion, which would be formed from any dehydrogenation product. As a tertiary carbonium ion, it is relatively stable and has little tendency to rearrange. Its reaction would be as indicated:

(1) Elimination of a H⁺ proton and formation of an olefin with the same skeletal arrangement,
(2) Collision with another paraffin and abstraction of a hydride ion (H⁻) to form a paraffin and another carbonium ion (which in this case would be an identical species).

By using the catalysts of the invention under the described operating conditions a high degree of conversion of the charge to selective yields of the desired olefins is obtained, with the additional advantage that the choice of operating conditions may be made within the described limits so as to obtain on the one hand exceptionally high yields of mono-olefins, namely 2,3-dimethyl butene-1 and 2,3-dimethyl butene-2; or, if desired, on the other hand, high yields of 2,3-dimethyl butadiene-1,3. Also, by proper choice of operating conditions all three of these olefins may be obtained in substantially equal amounts without sacrifice of total olefin yield.

When it is the object to produce high yields of the 2,3-dimethyl butenes, the conditions are selected so that the temperature is maintained in the range of 800–900° F., the space rate is 2–4 LHSV, the pressure is in the range of 0.5–1 atmosphere; hydrogen may be employed in amounts of up to about three mols per mol of charge, if one is willing to accept a somewhat lower yield of mono-olefin to obtain a higher degree of product purity. The addition of hydrogen is effective in suppressing diolefin formation and simultaneously reducing the amount of coke formation. It is to be understood, however, that operation within this range without the addition of hydrogen usually produces at least seven times as much mono-olefin as diolefin in the product.

If the desire is to make high yields of diolefin with relatively low yields of the mono-olefins, the operating conditions are selected so that the temperature is maintained in the range of 1000–1100° F. The space rate is in the order of 1–2 LHSV, and the pressure is less than 120 mm. Hg but higher than about 10 mm. Hg. In this type of operation the introduction of extraneous hydrogen is preferably avoided. The operation within the scope of this invention whereby substantially equal yields of mono- and diolefins may be obtained utilizes temperatures in the preferred range of about 900–1000° F., with a liquid hourly space rate of 1.5–2.5 volumes of charge per volume of catalyst per hour, pressure within the range of 300–400 mm. Hg, and no added hydrogen.

The operation of this invention may be effected by well-known processing methods including maintaining the catalyst as a fixed bed in the reaction zone, or having the catalyst maintained as a pseudo-liquid for so-called "fluidized" operation, or where the catalyst comprises a compact bed of particles moving under the influence of gravity. The charge may be introduced to contact with the catalyst and the products withdrawn in accordance with standard and well-known operating procedures. The adjustment of temperatures, pressures, and related process operations are likewise of standard nature and as such form no portion of the invention other than their proper association with the invention as described.

The process is preferably operated under conditions as closely approaching isothermal operation as is reasonably possible and practical in commercial equipment. In as much as the reaction is predominantly endothermic, heat must be introduced to the reaction system to maintain the reaction temperatures at or about the prescribed temperature levels. While isothermal operation is desired, it is to be understood that it is not only possible but practical to operate reactions of this nature under adiabatic conditions of the type understood and practiced such as in connection with the adiabatic fixed bed dehydrogenation of $C_4$ hydrocarbons to butylenes and butadiene; and it may be understood that the operating requirements, problems and equipment may be substantially the same, or modified with improvements where indicated as possible and practicable.

The following examples effected at the conditions within the scope of the inventtion as heretofore set forth will aid in the understanding and comprehension of the inventive principle and the advantages thereof. It is to be understood, however, that these examples are illustrative and are not to be taken as limiting the scope of the inventive principle.

EXAMPLE I

A sample of alumina beta trihydrate was admixed with aqueous nitric acid (10% by weight) and mulled to extrudable consistency and then extruded through a ³⁄₃₂-inch die plate. The extrudate was cut into particles approximately equal in length to diameter; then dried and dehydrated at 900° F. for four hours in a flowing stream of air. Upon cooling, the pellets (which had a surface area of 190 m.²/gram) were impregnated with an aqueous solution of chromic acid and sodium dichromate to deposite on the alumina pellets the equivalent of 20% chromia and 1.4% $Na_2O$ (by weight of the final catalyst). Impregnation was effected by soaking for two hours in the solution with periodic agitation and stirring. At the end of the impregnation period excess solution was removed by draining, and the pellets were then dried for two hours at 250° F. in a flowing stream of air. The dried pellets were heat-treated at 1400° F. for ten hours in an atmosphere of 20% steam and 80% air. After purging with nitrogen the pellets were given an additional ten-hour treatment at 1400° F. in a flowing atmosphere of 20% steam and 80% hydrogen. Subsequent to this treatment, further heating at 1400° F. for half an hour in an atmosphere of 20% steam and 80% nitrogen was followed by cooling to room temperature in an atmosphere of 100% nitrogen. The final catalyst had a surface area of 89 m.²/gram.

EXAMPLE II

The catalyst of Example I was utilized in the conversion of 2,3-dimethyl butane at operating conditions including a temperature of 900° F., a space rate of 2 LHSV, a pressure of 400 mm. of Hg, with an on-stream time of ten minutes and at substantially isothermal conditions. The production on a no-loss basis consisted of 97.8 wt. percent liquid, 1.7 wt. percent gas and 0.5 wt. percent coke. From the liquid product there were recovered 11.0 wt. percent of the charge of 2,3-dimethyl butene-1, and 13.7 wt. percent of the charge of 2,3-dimethyl butene-2. The selectivity to both of these mono-olefins was better than 67% by weight of the charge. Under these conditions only 3.2% by weight of the charge was 2,3-dimethyl butadiene-1,3.

EXAMPLE III

Another sample of the catalyst of Example I was used at more severe conditions for the conversion of 2,3-dimethyl butane to high yields of 2,3-dimethyl butadiene-1,3. The conditions included temperature of 1100° F., space rate of 1 LHSV, pressure of 20 mm. of Hg, and an on-stream time of ten minutes. On a no-loss basis there was recovered 82.6 wt. percent of the charge as liquid; 5.7 wt. percent of the charge was recovered as gas; and 11.7 wt. percent of the charge was converted to coke and similar hydrocarbonaceous material. The liquid product contained by weight of the charge 23.3% as 2,3-dimethyl butadiene-1,3. The mono-olefin production was 3.8 wt. percent of the charge for the −1 form and 3.4 wt. percent of the charge as the −2 form. The selectivity to 2,3-dimethyl butadiene-1,3 was 42.1 wt. percent of the charge.

EXAMPLE IV

In an operation similar to that of Examples II and III except that the conditions were modified to obtain substantially equal yields of the several olefinic products the following information is in point. The temperature was 1000° F.; the space rate was 2 LHSV; the pressure was 400 mm. Hg; and on-stream time was ten minutes. Approximately 91% liquid by weight of the charge was recovered, with 5 wt. percent as gas and 3.7 wt. percent as coke. The liquid product contained by weight of the charge 10.0% 2,3-dimethyl butene-1, 10.2% 2,3-dimethyl butene-2, and 11.3% 2,3-dimethyl butadiene-1,3. This represents a yield of 31.5 wt. percent of the charge as desired olefins obtained at a selectivity level of 59.5 wt. percent of the charge.

EXAMPLE V

A dehydrogenation catalyst comprising 20% chromia supported on activated "gamma-form" alumina was prepared by impregnating pelleted alumina, derived from alpha-trihydrate, with a suitable quantity of an aqueous solution of chromic acid followed by drying and calcining. This catalyst was utilized in the conversion of 2,3-dimethyl butane at 1000° F., a space rate of 2 LHSV, a pressure of 400 mm. Hg with a ten-minute on-stream operating period. There was recovered by weight of the charge 96.5% as liquid, 2.3% as gas, and 1.2% as coke. On the basis of the charge there was recovered 7.4 wt. percent 2,3-dimethyl butene-1, 8.2 wt. percent 2,3-dimethyl butene-2, and 6.2 wt. percent 2,3-dimethyl butadiene-1,3.

It will be seen upon comparison with Example IV that the selectivity is 63.5 but that the yield is only 21.8 wt. percent of the charge as compared to 31.5 wt. percent of the charge in Example IV.

The nature and treatment of the catalysts and the data on Examples II through V above are tabulated below in Table I with additional data presented as Examples VI–VIII.

therefore only such limitations should be imposed as are indicated in the appended claims.

What is claimed is:

1. The process of selective dehydrogenation, without substantial isomerization, of 2,3-dimethyl butane to high yields of $C_6$ olefins, said process comprising contacting 2,3-dimethyl butane at conditions including a temperature in the range of 800 to 1100° F., a charge rate in the range of 0.5 to 4 volumes, as liquid, per volume of catalyst per hour, a pressure in the range of at least 10 mm. Hg absolute to no greater than atmospheric with a catalyst characterized in composition as a porous eta alumina support containing as essential part thereof 5 to 40 percent by weight of chromium component expressed as $Cr_2O_3$ and from 0.5 to 2 percent by weight expressed as the oxide of at least one of the alkalis of the group consisting of sodium and potassium, said catalyst being further characterized in having been treated with an atmosphere comprising a major portion of hydrogen at a temperature in the range of 1300° to 1500° F. for a time period of at least one hour and no more than ten hours to adjust the surface area thereof to between 70 to 100 m.$^2$/gram.

2. The process in accordance with claim 1 wherein said catalyst comprises about 20 percent by weight $Cr_2O_3$, 0.5 to 2 percent by weight sodium, and the balance eta alumina.

3. The process in accordance with claim 1 wherein the dehydrogenation is effected under conditions including a temperature in the range of 800° to 900° F., a space rate in the range of 2 to 4 LHSV, a pressure in the range of 0.5 to one atmosphere and added hydrogen in the range

*Table I*

| Example No. | II | III | IV | V | VI | VII | VIII |
|---|---|---|---|---|---|---|---|
| Catalyst base | | Beta trihydrate | | Alpha-trihydrate | | Beta trihydrate | |
| Heat treatment | 1,400–10–20% $H_2O$ 80% air plus 1,400–10–20% $H_2O$ 80% $H_2$. | 1,400–10–20% $H_2O$ 80% air plus 1,400–10–20% $H_2O$ 80% $H_2$. | 1,400–4–20% $H_2O$ 80% $H_2$. | 1,700–2–B.D.A. | 1,700–2–B.D.A. | 1,400–10–20% $H_2O$ 80% air plus 1,400–10–20% $H_2O$ 80% $H_2$. | 1,400–4–20% $H_2O$ 80% air. |
| Final $Al_2O_3$ form | Eta | Eta | Eta | Gamma | Gamma | Eta | Eta. |
| S.A. m.$^2$/g | 89 | 89 | | 50 | 50 | 89 | 87. |
| Particle size m | 1.6 | 1.6 | 2.4 | 4.0 | 4.0 | 1.6 | 2.4. |
| $Na_2O$ | 0.8 | 0.8 | 1.1 | 0.4 | 0.4 | 0.8 | 1.1. |
| Charge | | | | 2,3-dimethyl butane | | | |
| Temperature °F | 900 | 1,100 | 1,000 | 1,000 | 900 | 800 | 850. |
| LHSV | 2 | 1 | 2 | 2 | 2 | 2 | 2. |
| Pressure, mm. Hg absolute | 400 | 20 | 400 | 400 | 400 | 400 | 400. |
| Products, weight percent of charge: | | | | | | | |
| Liquid | 97.8 | 82.6 | 91.3 | 96.5 | 98.7 | 99.0 | 97.5. |
| Gas | 1.7 | 5.7 | 5.0 | 2.3 | .9 | .6 | 1.8. |
| Coke | .5 | 11.7 | 3.7 | 1.2 | .4 | .4 | .7. |
| Conversion, weight percent charge | 36.4 | 55.3 | 53.0 | 34.4 | 20.9 | 17.7 | 33.3. |
| 2,3-dimethylbutene-1 (1): | | | | | | | |
| Selectivity, weight percent | 30.2 | 6.8 | 18.9 | 21.6 | 27.0 | 34.1 | 33.4. |
| Yield, weight percent | 11.0 | 3.8 | 10.0 | 7.4 | 5.6 | 6.0 | 11.1. |
| 2,3-dimethylbutene-2 (2): | | | | | | | |
| Selectivity, weight percent | 37.6 | 6.2 | 19.3 | 23.9 | 33.6 | 50.9 | 42.2. |
| Yield, weight percent | 13.7 | 3.4 | 10.2 | 8.2 | 7.0 | 9.0 | 14.1. |
| 2,3-dimethylbutadiene-1,3 (3): | | | | | | | |
| Selectivity, weight percent | 8.8 | 42.1 | 21.3 | 18.0 | 21.2 | 4.5 | 6.4. |
| Yield, weight percent | 3.2 | 23.3 | 11.3 | 6.2 | 4.4 | .8 | 2.1. |
| (1)+(2): | | | | | | | |
| Selectivity | 67.8 | 13.0 | 38.2 | 45.5 | 60.6 | 85.0 | 75.6. |
| Yield | 24.7 | 7.2 | 20.2 | 15.6 | 12.6 | 15.0 | 25.2. |
| (1)+(2)+(3): | | | | | | | |
| Selectivity | 76.6 | 55.1 | 59.5 | 63.5 | 81.8 | 89.5 | 82.0. |
| Yield | 27.9 | 30.5 | 31.5 | 21.8 | 17.0 | 15.8 | 27.3. |

While the foregoing examples utilize catalysts prepared in accordance with this invention containing sodium, approximately similar beneficial results are obtained when potassium is substituted in part or in its entirety for the sodium.

Obviously, many modifications and variations of the present invention as hereinbefore set forth may be made without departing from the spirit and scope thereof and of zero to three mols per mol of charge, thereby favoring production predominantly of $C_6$ mono-olefins.

4. The process in accordance with claim 1 wherein the dehydrogenation is effected under conditions including a temperature in the range of 1000° to 1100° F., a space rate in the range of 1 to 2 LHSV, and a pressure of at least 10 mm. Hg absolute and no higher than 120 mm. Hg absolute, thereby favoring production of $C_6$ diolefins.

5. The process in accordance with claim 1 wherein said $C_6$ olefins are produced in very high yield, said contacting conditions including a temperature in the range of 900° to 1000° F., a space rate in the range of 1.5 to 2.5 LHSV, and a pressure within the range of 300 to 400 mm. Hg absolute.

References Cited in the file of this patent

UNITED STATES PATENTS

| | | |
|---|---|---|
| 2,438,315 | Frey | Mar. 23, 1948 |
| 2,921,102 | Lowman | Jan. 12, 1960 |
| 2,982,798 | Hachmuth et al. | May 2, 1961 |

UNITED STATES PATENT OFFICE
CERTIFICATE OF CORRECTION

Patent No. 3,064,062                          November 13, 1962

Waldemar Lorz et al.

It is hereby certified that error appears in the above numbered patent requiring correction and that the said Letters Patent should read as corrected below.

Column 2, lines 55 to 60, upper right-hand portion of the formula, for "parafin" read -- paraffin --; same lines 55 to 60, lower right-hand portion of the formula, for "CH-CO3" read -- CH-CH3 --; column 4, lines 15 and 16, for "deposite" read -- deposit --; columns 5 and 6, Table I, line 1, arrows should be drawn to show "Beta trihydrate" belongs to columns II and IV; same table, line 11, arrows should be drawn to show "2,3-dimethyl butane" belongs to columns II, III, VI, VII and VIII.

Signed and sealed this 6th day of August 1963.

(SEAL)
Attest:

ERNEST W. SWIDER                            DAVID L. LADD
Attesting Officer                                Commissioner of Patents